Jan. 27, 1959   R. F. DOWLING   2,871,000
APPARATUS FOR STIRRING GLASS
Filed March 12, 1956
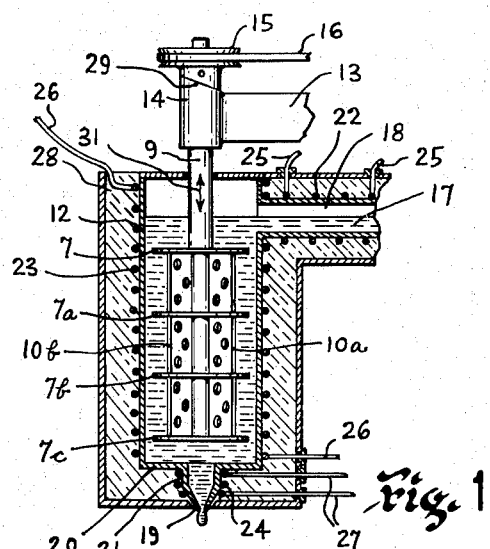
Fig. 1
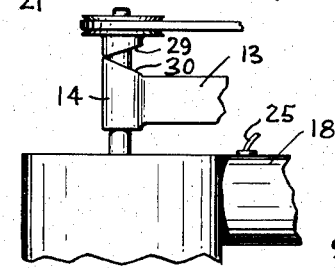
Fig. 2
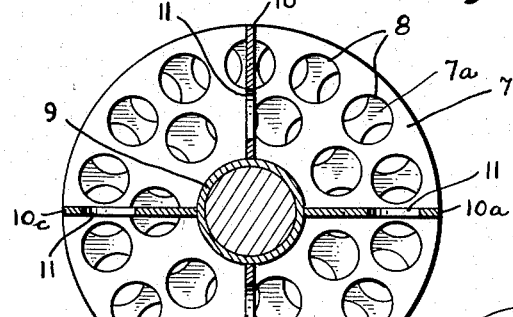
Fig. 4
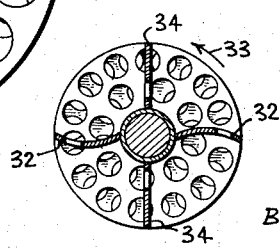
Fig. 6
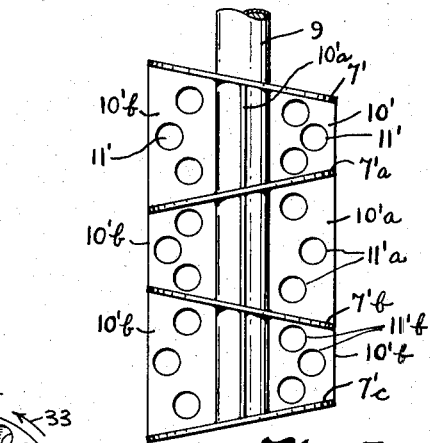
Fig. 3
Fig. 5
INVENTOR
ROBERT F. DOWLING
BY
Louis L. Gagnon
ATTORNEY United States Patent Office 2,871,000
Patented Jan. 27, 1959

2,871,000

APPARATUS FOR STIRRING GLASS

Robert F. Dowling, Sturbridge, Mass., assignor to American Optical Company, Southbridge, Mass., a voluntary association of Massachusetts Application March 12, 1956, Serial No. 570,778

12 Claims. (Cl. 259—4)

This invention relates to glass fabrication and has particular reference to the provision of a novel apparatus, stirring device for use with said apparatus and method of stirring glass during the continuous or semi-continuous flow thereof through said apparatus.

One of the principal objects of the invention is to provide a novel rotatable and/or oscillatable stirring device for use with a cylindrically-shaped stirring chamber into which a continuous or semi-continuous flow of molten glass is directed and having an outlet opening in the lower end thereof, and method of stirring said glass wherein the normal gravital flow of portions of the glass is interrupted by a greater amount than other portions thereof while imparting a force tending to rotate and displace portions of said glass in a direction outwardly toward the inner walls of the cylindrically-shaped chamber and while simultaneously causing portions of the more centrally disposed glass to be rotated by an amount greater than other portions thereof and/or simultaneously causing portions of said glass to be displaced in an upward and downward direction by an amount greater than other portions thereof whereby desired more complete homogenization takes place.

Another object is to provide a stirring device for use with an arrangement as set forth above and method of making the same embodying a rotatable shaft having a plurality of progressively spaced perforated disks secured thereto with the perforations in each successive disk being in offset relation with the preceding disk in a direction longitudinally of said shaft and having radially disposed perforated webs therebetween and secured adjacent one edge thereof to said shaft and at the upper and lower edges thereof to said disks and being of a radial length to extend substantially to the peripheral edges of said disks, the said perforations in said webs being in offset relation with each other.

Another object is to provide a stirring device of the above character wherein the perforated disks are so attached to the shaft as to be alternately angled in opposite directions relative to the longitudinal axis of the shaft and the radially disposed perforated webs are so shaped and dimensioned as to fit between said angled disks in substantially diametrically opposed relation with each other whereby portions of the glass, during the rotation of said device, will be caused to move in opposite upward and downward directions with respect to the longitudinal axis of the cylindrical chamber in response to the angular disposition of said disks and with said disks and webs and the offset perforations therein simultaneously functioning as set forth above to bring about the desired homogenization of the glass.

Another object is to provide a stirring device of the above character wherein the perforations in the respective adjacently spaced disks are in offset relation with each other and the perforations in the respective progressively arranged webs are in offset relation with each other whereby indirect passage of glass through said perforations will take place and wherein the diameters of the respective perforations and speed of rotation of the device is controlled in accoradnce with the viscosity of the molten glass whereby the desired homogenization of the glass will take place.

Another object is to so dimension and position a stirring device of the above character in relation with the cylindrical chamber of the apparatus as to introduce an outward displacement of the glass toward the inner walls of said cylindrical chamber in response to centrifugal force whereby the flow of the glass adjacent said walls and in a direction downwardly thereof will be interrupted.

Another object is to so control the related size and offset relation of the apertures in said disks and in said webs of the stirring device in accordance with the viscosity of the glass and to further control the rate of flow of the molten glass through the cylindrical chamber as to make possible the homogenizing of the glass at a relatively slow speed of rotation of said device.

Another object is to provide stirring devices of the above character which, while efficient as to homogenization of ophthalmic glasses, are readily adaptable to homogenization of other commercial glasses or liquid mixtures having similar characteristics.

Another object is to provide stirring devices of the above nature which are durable and efficient in construction and simple and inexpensive to fabricate.

Other objects and advantages of the invention will become apparent from the following description taken in connection with the accompanying drawings wherein:

Fig. 1 is a diagrammatic fragmentary sectional view of a homogenizing chamber showing the related position of the devices embodying the invention;

Fig. 2 is a fragmentary view of the upper supporting mechanism for a stirring device embodying the invention;

Fig. 3 is a side elevational view of said stirring device;

Fig. 4 is an enlarged sectional view taken as on line 4—4 of Fig. 3 and looking in the direction indicated by the arrows;

Fig. 5 is a side elevational view of a modified form of the invention; and

Fig. 6 is a sectional view similar to Fig. 4 of a further modification of the invention.

In the fabrication of glass, particularly optical or ophthalmic glass, it is particularly desirable that the resultant glass have a high degree of homogeneity free from cords or striations. The present invention, therefore, is directed particularly to an apparatus, stirring device and method of making and using the same for bringing about more complete homogeneity of the glass particularly in glass fabricating arrangements wherein the flow of the glass during said homogenization is continuous or semi-continuous.

Referring to the drawings wherein like characters of reference designate like parts throughout the various views, the device embodying the invention, as shown in Figs. 1, 3, and 4, comprises a plurality of spaced disks 7, 7a, 7b, and 7c having a plurality of spaced openings 8 extending directly therethrough. The said disks are secured to a spindle or shaft 9 in substantially normal relation to the longitudinal axis thereof and are joined with each other by a plurality of radially disposed webs 10, 10a, 10b, and 10c having their inner edges joined with shaft 9 and their outer edges in substantially flush relation with the outer contour edges of disks 7, 7a, 7b and 7c respectively. The webs 10, 10a, 10b and 10c also have a plurality of spaced openings 11 therein. The joined webs 10, 10a, 10b and 10c and disks 7, 7a, 7b and 7c form a plurality of superimposed pocket-like portions radially disposed about shaft 9.

As best shown in Fig. 4, the openings in the disk 7 are in offset relation with the openings in disk 7a, the openings in the disk 7a are in offset relation with the openings in the disk 7b and the openings in the disk 7b are in offset relation with the openings in the disk 7c whereby the progressive path of the molten glass through said respective offset openings will be interrupted.

The device is fabricated from platinum, or a suitable refractory.

The said device, as shown in Fig. 1, is rotatively supported in a cylindrical chamber 12 by a bracket 13 having a bearing 14 in which the spindle or shaft 9 is extended. The shaft, on the upper end thereof, has a pulley or the like 15 adapted to be driven by a suitable variable speed device, not shown, through a belt 16. The chamber 12 is connected with a suitable glass melting furnace, not shown, so that the molten glass, illustrated by the dash lines 17, may flow continuously or semi-continuously from said furnace through a suitable passageway 18 into said chamber 12 and eventually be discharged therefrom through a restricted orifice 19 communicating with the lower portion of the chamber.

The stirring device is so dimensioned that the peripheral edges of the disks 7 and the outer longitudinal edges of the webs or fins will be adjacent but spaced a distance from the inner walls of said chamber sufficient to prevent said disks and webs or fins from engaging said inner walls should the shaft or spindle become slightly bent or displaced in a sidewise direction during the use of the device. However, it is important that the edges of the disks and webs be positioned as close to the inner wall of the chamber as is practical from said displacement viewpoint so as to insure against direct gravital flow of the molten glass downwardly of said wall without interruption.

It is also important, due to changes in the characteristics of the upper level glass or other liquid which takes place in the form of contamination from exposure to air and volatilization and which to a large extent causes cords and striations, that the upper disk 7 be placed a sufficient distance below said upper level glass as to insure against too rapid drawing of said glass downwardly. The lower disk 7c of the device is also spaced a controlled distance from the lower end wall 20 of the chamber above the outlet portion 21 which terminates in the restricted orifice 19. This control of the distance between the lower disk 7c and the bottom of the chamber is in accordance with the viscosity of the glass and further in accordance with the rate at which the glass passes through the orifice 19 so as to avoid having too great a volume of the homogenized glass accumulate at the bottom of the container below the stirrer whereby an undesirable stagnant pool might result.

In order to maintain the glass at a desired viscosity, suitable heating coils 22, 23 and 24 respectively connected by terminals 25, 26 and 27 to a suitable source of electrical energy are located in encircling relation with the passageway 18, chamber 12, and outlet portion 21. The said passageway 18, chamber 12, and outlet portion 21 and the respective heating coils are covered with a layer of suitable insulating material 28.

In addition to rotating the said device internally of said chamber 12, suitable means such as angled cam surfaces 29 and 30 on said pulley 15 and bearing 14 respectively, as shown in Figs. 1 and 2, may be provided for oscillating the spindle or shaft 9 vertically, during the rotation thereof, as illustrated by the arrow 31.

It is further pointed out that the openings 11 in the web 10a are in offset relation with the openings in the webs 10 and 10b, the openings 11 in the web 10b are in offset relation with the openings in the webs or fins 10a and 10c and the openings 11 in the web 10c are in offset relation with the openings in the webs 10 and 10b whereby the path of flow of the glass through said openings in said successive webs will be interrupted during the rotation of said device.

It is to be understood that the oscillation of said device, as mentioned above, may, in some instances, be eliminated by the omission of the cam surface 29 and 30 whereby the said device will only be rotated.

In some instances with or without the oscillation, a modified device, such as shown in Fig. 5, may be utilized. The said device, in Fig. 5, is substantially identical in construction with the device illustrated in Fig. 3 with the exception that the disks 7', 7'a, 7'b, and 7'c are angularly disposed in progressively opposite directions with respect to the longitudinal axis of the spindle or shaft 9 and the webs 10', 10'a, 10'b and 10'c similar to webs 10, 10a, 10b, and 10c are respectively shaped and dimensioned so as to be fitted and secured in between said disks and in diametrically opposite radial relation with said spindle or shaft 9.

The openings 11', in said respective webs, are in offset relation with each other in a manner similar to that described in connection with the radial webs of the device shown in Figs. 3 and 4 and the openings in the respective disks 7', 7'a, 7'b, and 7'c are also in offset relation with each other as described in connection with the construction shown in Figs. 3 and 4 whereby the direct passage of the glass from one group of openings through another group is interrupted.

The oppositely angled relation of the disks 7' through 7'c is for the purpose of causing portions of the glass to be displaced in upward and downward directions during the rotation of the device inwardly of the cylindrically-shaped chamber 12. The device may or may not include the cam means 29 and 30 for oscillating the entire device in addition to the above.

The function of the device illustrated in Figs. 1 through 4 and the method of homogenizing resulting therefrom is substantially as follows:

During the continuous or semi-continuous flow of molten glass 17 inwardly through said chamber 12 and while maintaining said molten glass at a predetermined level, the stirring device is rotated internally of said chamber whereby the disks 7 through 7c and the webs 10 through 10c, will, as will any offset member rotated in said glass, cause the glass throughout the effective length of said device to be centrifugally forced in a sidewise direction outwardly towards the inner side walls of the chamber 12 and thereby counteract and retard the gravital flow of said glass in a direction downwardly along said inner walls. Furthermore, the glass which was initially adjacent said inner walls will be displaced by the outwardly forced glass inwardly toward the stirring device and the solid portions of the various webs 10 through 10c having the openings 11 therein will again force the portions of the inwardly disposed glass in an outward direction while permitting portions of the glass aligned with said openings to pass therethrough. Due to the offset relation of the openings 11 in the progressively radially arranged webs 10 through 10c the portions of the glass which pass through one of said webs will be engaged by the solid portions of the next succeeding web and will thereby be forced outwardly while permitting other portions of the glass to pass through the openings in said web. Simultaneous to this forcing of portions of the glass outwardly by the webs and in response to the gravital flow of the glass, portions of said downwardly moving glass will pass through the openings 8 in the disks 7—7c, while other portions thereof will be retarded by the solid portions of said disks. The portions of the glass flowing through said openings 8 will be intermixed with portions of the glass which are forced inwardly from the inner walls of the chamber and said mixed inwardly disposed glass will be forced outwardly by the solid portions of the webs while other portions thereof will be permitted to pass through the openings in said webs. The rotation of said device, while causing the above action to take place, also causes a general rotation of the glass in said chamber with portions thereof being moved at a greater rate of speed than other of said portions. The extent of flow as permitted by said openings in said respective disks and in said respective webs and the rate of outward displacement of the glass by the solid portions of the webs, may be controlled by the size of the openings and by the speed of rotation of the device and by proper related control, in accordance with the viscosity of the molten glass, more complete homogenization in each instance may be obtained. However, as the glass progresses downwardly under the action of gravity, the above treatment thereof is repeated by the successive sets of disks and webs until the glass ultimately reaches the bottom of the chamber and passes through the restricted opening 19. In this manner, more complete homogenization is insured.

If desired, in some instances, in addition to said rotation of said device, the said device may be oscillated as a unit through the provision of suitable cam means 29 and 30. This upward and downward movement will cause portions of the molten glass engaged by the solid portions of the disks to be displaced greater amounts than the portions permitted to pass through the perforations of said disks. The portions of the glass flowing downwardly through the perforations in the disks will simultaneously be engaged by the rotating perforated webs whereby the portions of the glass engaged by the solid portions of the web will be forced outwardly at a greater speed than the portions permitted to pass through the perforations thereof.

Although desirable results have been obtained by merely rotating the device, further desirable results with certain glass batches may be obtained by simultaneously oscillating the device.

The device, illustrated in Fig. 5, while functioning in a manner similar to the device illustrated in Figs. 1, 3, and 4, due to the opposite angular dispositions of the disks 7' through 7'c will cause portions of the glass to be displaced in an upward and downward direction greater amounts than other portions thereof which are permitted, within restricted limits, intermediate the respective disks to flow through said openings in the disks in a downward direction and into the path of the rotating perforated webs 10'—10'b and simultaneous to said downward flowing will be forced outwardly in a sidewise direction with the portions of the glass engaged by the solid portions of the disk being forced outwardly at a speed greater than the portions of said glass which are permitted to pass through the openings in the disks. This outward forcing of the glass will cause molten glass located initially adjacent the inner walls of the chamber to be displaced inwardly whereby it will admix with the glass flowing downwardly of the openings in the disks and portions of said admixed glass will be forced outwardly by the solid portions of the webs at a speed greater than other portions thereof which are permitted to pass through the openings in said webs. This function is repeated by each set of respective disks and webs throughout a controlled cycle whereby the glass approaching the lower portion of the chamber will be of a desired homogeneity.

Here, again, the size of apertures, angles of the disks and speed of rotation of the device are so correlated as to bring about more complete homogenization. The portion of the glass which is forced downwardly by the disk 7'c will travel at a rate of speed greater than the flow of the glass through the restricted orifice 19 and will thereby cause glass in the lower area of the chamber to be displaced upwardly in response to said downward force. This further adds to the homogenization effect of the device.

It is also pointed out that the oscillating effect of the device illustrated in Fig. 1, will bring about a similar result, that is, downward movement of the disk 7c will cause portions of the glass beneath the disk to be moved downwardly at a speed greater than the flow of the glass outwardly of the restricted orifice 19 and will cause glass initially in said lower portion of the chamber to be displaced upwardly thereby adding to the effectiveness of the device.

While the openings in the disks have been defined as being in offset relation with each other, this is preferable when the devices are oscillated as a unit. When the devices are merely rotated, this relation of the openings is of less importance and they may, in such instances, be aligned or randomly related as desired.

It is further pointed out that when the device is oscillated simultaneous to the rotation thereof, the speed of rotation may be considerably decreased while still obtaining desirable homogenization.

While the webs have been shown and described as all being substantially straight and radially disposed with respect to the spindle or shaft 9, it is to be understood that one set of said diametrically opposed webs may be cupped, such as shown at 32 in Fig. 6, so as to increase the outward flow or inward flow of the peripherally disposed glass depending upon the direction of rotation of said webs. For example, if the device is rotated in the direction indicated by the arrow 33, the webs 32 will force the peripheral portions of the glass in an outward direction at a more rapid rate than the radially disposed straight webs 34 and, on the other hand, if the device is rotated in a direction opposite to that shown by the arrow 33, the said webs 32 will force the peripheral portions of the glass inwardly at a more rapid rate than said webs 34. It is to be understood that similar diametrically opposed webs between each of said disks in each of said devices shown in Figs. 3 and 5 may be curved similar to the webs 32.

It is further to be understood that instead of forming the webs 34 and the similar webs of the devices of Figs. 3 and 5 straight, the said webs may be curved in a direction opposite to the curvature of the webs 32, if desired, whereby one set of webs will more rapidly force portions of the glass outwardly while the other set of webs will more rapidly draw portions of the glass inwardly depending upon the direction of rotation of the device.

From the foregoing description, it will be seen that simple, efficient and economical means and methods have been provided for accomplishing all of the objects and advantages of the invention. However, it is to be understood that various omissions, substitutions and changes in the form and details of the embodiments shown and described may be made by those skilled in the art without departing from the spirit of the invention as expressed in the accompanying claims and that all matter herein is to be interpreted as illustrative and not in a limiting sense.

Having described my invention, I claim:

1. A stirring device of the character described comprising a shaft, a plurality of perforated disks secured concentrically to said shaft with the perforations in each successive disk being in offset relation with the perforations in the preceding disk in a direction longitudinally of said shaft, radially disposed perforated webs between said disks each having their inner edge secured to said shaft and their upper and lower edges secured to the adjacent disks, the outer edges of said webs being substantially in meeting relation with the outer annular edges of said adjacent disks and the perforations therein being in offset relation with each other.

2. A stirring device of the character described comprising a shaft, a plurality of concentrically related disks secured in spaced relation with each other along the longitudinal axis of said shaft with the planes of the disks alternately angled in opposite directions relative to said longitudinal axis, some of said disks having perforations therein in offset relation with respect to perforations in other of said disks, said shaft having radially disposed webs secured thereto intermediate said disks, the planes of said webs being disposed in the direction of the axis of the shaft and each having their opposed end edges shaped to and joined to the sides of the adjacent upper and lower disks so as to form a plurality of superimposed pocket-like portions radially disposed about said shaft, some of said webs having perforations therein in offset relation with respect to perforations in other of said webs.

3. A stirring device of the character described comprising a shaft, a plurality of concentrically related perforated disks angularly disposed in progressively opposite directions and secured in spaced relation with each other to said shaft, a plurality of progressively arranged webs secured intermediate said progressively arranged perforated disks with the inner edges thereof attached to the shaft and the upper and lower edges thereof shaped and attached to the respective adjacent disks, the outer edges of each of said webs being substantially in meeting relation with the outer edges of the respective disks attached thereto so as to form a plurality of superimposed pocket-like portions radially disposed about said shaft, said openings in said respective disks and in said respective webs being in offset relation with each other.

4. A stirring device of the character described comprising a shaft having a plurality of spaced perforated disks secured in concentric relation therewith, a plurality of progressively arranged substantially radially disposed perforated webs secured at their inner edges to said shaft intermediate each of said disks, the upper and lower edges of said webs being secured to the adjacent sides of said disks with the outer edges thereof substantially in meeting relation with the edges of said disks, certain of said webs being curved about an axis substantially parallel with the axis of the shaft.

5. In a device of the character described the combination of a stirring chamber, means for directing molten glass inwardly of said chamber, a stirring device rotatably supported within said chamber, said device comprising a shaft having a plurality of concentrically related perforated disks secured in spaced relation along said shaft and being of a diameter such as to be disposed in spaced relation with the side walls of the chamber, a plurality of radially arranged perforated webs secured at their inner edges to said shaft intermediate said disks, the upper and lower edges of said webs being secured to the adjacent sides of said disks with the outer edges thereof substantially in meeting relation with the edges of said disks, said device being so disposed in said chamber as to have its upper disk a given distance below the upper level of the glass in said chamber and its lower disk spaced a controlled distance from the bottom of said chamber.

6. In a device of the character described the combination of a cylindrical chamber having an opening in the bottom thereof, means for directing molten glass inwardly of the top of said chamber for normal gravital flow longitudinally of said chamber outwardly of said opening and a stirring device in said chamber comprising a shaft having a plurality of spaced perforated disks secured thereto and in concentric relation therewith, a plurality of perforated webs intermediate said disks the inner edges of each of said webs being secured to said shaft and the upper and lower edges thereof secured to the respective sides of the adjacent disks and means for rotating said stirring device inwardly of said chamber.

7. In a device of the character described the combination of a cylindrical chamber having a restricted opening in the bottom thereof, means for directing molten glass inwardly of the top of said chamber for normal gravital flow longitudinally of said chamber outwardly of said opening and a stirring device in said chamber comprising a shaft having a plurality of spaced disks secured thereto and in concentric relation therewith, a plurality of webs intermediate said disks, the inner edges of each of said webs being secured to said shaft and the upper and lower edges thereof being secured to the respective sides of the adjacent disks, means for rotating said stirring device inwardly of said chamber and for causing oscillation thereof in a direction longitudinally of said chamber as a unit, some of said disks and webs having perforations therein and in offset relation with other of said respective disks and webs.

8. A stirring device of the character described comprising a shaft, a plurality of radially disposed outwardly opening pocket-like portions in superimposed relation with each other about said shaft embodying a plurality of progressively spaced perforated disks concentrically secured to said shaft and perforated interconnecting webs intermediate said disks.

9. In a device of the character described, an elongated cylindrically-shaped stirring member having a centrally located shaft therethrough, a plurality of radially disposed vertical baffles secured to said shaft and a plurality of spaced disks connected to said baffles and shaft to form a plurality of superimposed pocketed portions radially disposed about said shaft, the walls of said pocketed portions each being perforated in such a manner as to cause the perforations in any one of said walls of a particular pocket portion to be in offset relation with the perforations in the others thereof whereby a material when caused to flow into one of said pockets through a particular wall will, in flowing outwardly through any one or more of the remaining walls of said pocket, be caused to alter its course of flow and thus introduce a homogenizing effect to said material.

10. A stirring device of the character described comprising a shaft, a plurality of vertically and horizontally disposed baffles connected to said shaft, said horizontal baffles being connected to said vertical baffles so as to provide a plurality of open ended substantially wedge shaped superimposed pocket portions each having their apex substantially coincident with the axis of said shaft, certain of said baffles being perforated and being arranged so that the perforations in one baffle are in offset relation with the perforations in another of said baffles which form a part of a particular pocket portion whereby a material when caused to flow into one of said pocket portions through a perforated baffle will, in flowing outwardly through any of the remaining perforated baffles of said pocket portion, be caused to alter its course of flow and thus introduce a homogenizing effect to said material.

11. In a device of the character described, the combination of a cylindrical chamber having a restricted orifice in the bottom thereof, means for directing a flow of molten glass inwardly of said chamber at a rate sufficient to maintain said molten glass at a given upper level and a rotatable stirring device in said chamber having a shaft, a plurality of vertically and horizontally disposed baffles about said shaft and connected thereto, said horizontal baffles being connected to said vertical baffles so as to provide a plurality of open ended substantially wedge shaped superimposed pocket portions each having their apex substantially coincident with the axis of said shaft, certain of said baffles being perforated and being arranged so that the perforations in one baffle are in offset relation with the perforations in another of said baffles which form a part of a particular pocket portion whereby a material when caused to flow from said chamber into one of said pocket portions through a perforated baffle will, in flowing outwardly through any of the remaining perforated baffles of said pocket portion, be caused to alter its course of flow and thus introduce a homogenizing effect to said material, the length of said stirring device being such as to cause its uppermost part to be disposed below said upper level of the glass in said chamber and its lowermost part located at a given spaced relation with the bottom of said chamber.

12. A stirring device of the character described comprising a shaft, a plurality of outwardly diverging pocketlike portions in superimposed relation with each other about said shaft, said pocketlike portions embodying a plurality of progressively spaced platelike members of curved contour lying in planes angularly disposed relative to the axis of the shaft and webs intermediate said platelike portions disposed generally in the direction of the longitudinal axis of said shaft, said webs having portions of their upper and lower edges secured to the side surfaces of said platelike members and having inner edge portions secured to said shaft to produce said pocketlike portions and certain of said platelike members and webs having perforations therein.

References Cited in the file of this patent

UNITED STATES PATENTS

| 209,767 | McBrayer et al. | Nov. 12, 1878 |
| 565,007 | Lawton | Aug. 4, 1896 |
| 2,569,459 | DeVoe | Oct. 2, 1951 |
| 2,730,338 | Gregarius | Jan. 10, 1956 |